United States Patent [19]
Brehmer et al.

[11] Patent Number: 5,855,460
[45] Date of Patent: Jan. 5, 1999

[54] SCREW AND NUT ASSEMBLY

[75] Inventors: Dieter Brehmer, Hanover; Horst Breidel, Ronnenberg; Friedrich Gross, Seelze; Peter Homann, Neustadt; Wilfried Matthias, Bad Nenndorf; Herbert Unger, Springe, all of Germany

[73] Assignee: WABCO GmbH, Hanover, Germany

[21] Appl. No.: 872,798

[22] Filed: Jun. 10, 1997

[30] Foreign Application Priority Data

Jun. 13, 1996 [DE] Germany ................. 196 23 522.7

[51] Int. Cl.$^6$ ................. F16B 31/02; F16B 35/00
[52] U.S. Cl. ................. 411/14; 411/383; 411/395
[58] Field of Search ................. 411/13, 14, 383, 411/385, 395

[56] References Cited

U.S. PATENT DOCUMENTS

| | | | |
|---|---|---|---|
| 4,709,654 | 12/1987 | Smith | 411/14 X |
| 4,909,685 | 3/1990 | Hirst | 411/14 X |
| 5,472,302 | 12/1995 | Yandle, II | 411/14 |
| 5,553,982 | 9/1996 | Hashikawa | 411/14 |

FOREIGN PATENT DOCUMENTS

| | | |
|---|---|---|
| 43 24 878 A1 | 12/1994 | Germany . |
| 4-302705 | 10/1992 | Japan ................. 411/14 |

*Primary Examiner*—Neill Wilson
*Attorney, Agent, or Firm*—Proskauer Rose LLP

[57] ABSTRACT

A screw and nut assembly comprises a screw having a hollow cavity extending longitudinally throughout, a nut configured to screw onto the screw, and an extension attached to the nut. The extension traverses the hollow cavity of the screw when the nut is placed on an end of the screw without being screwed on. The extension is displaced from the hollow cavity of the screw as the nut is screwed onto the screw. The status of the screw and nut connection may thus be determined from the screw side of the assembly, without observing the nut, by observing the extent to which the extension has emerged from the hollow cavity in the screw.

10 Claims, 2 Drawing Sheets

SCREW AND NUT ASSEMBLY

FIELD OF THE INVENTION

The instant invention relates to a screw and nut assembly in which the status of the screw and nut connection may be easily determined from the side of the screw. More particularly, the invention relates to a screw and nut assembly wherein the screw has a hollow cavity with an extension disposed therein. As the nut is screwed onto the screw, the extension emerges from the hollow cavity to a degree that is proportional to the extent to which the nut is screwed onto the screw. This structural design enables the user to evaluate the status of the nut and screw connection from the screw side of the connection.

BACKGROUND OF THE INVENTION

Screw and nut assemblies are frequently used to connect two or more components together. Often when screw and nut assemblies are used, the nut is not visible from the side of the screw. This makes it virtually impossible to ascertain the status of the screw and nut connection from the side where the screw has been inserted. When using the known screw and nut assemblies, the nut itself must be inspected in order to determine the status of the connection. This is not always possible or convenient. Therefore, a screw and nut assembly that allows evaluation of the screw and nut connection from the side of the screw is needed.

It is the object of the present invention to provide a screw and nut assembly that allows evaluation of the screw and nut connection from the side on which the screw is inserted without having to inspect the nut.

SUMMARY OF THE INVENTION

In accordance with the instant invention, a screw and nut assembly comprises a threaded screw having a longitudinally extending hollow cavity, and a nut having an extension that traverses the hollow cavity of the threaded screw when the nut is placed on the screw without being screwed on. When the screw and nut are screwed together, the extension is displaced in a longitudinal direction and begins to emerge from the opening of the hollow cavity in the screw, which opening is located at an end of the screw opposite from the nut. The more the nut and screw are screwed together, the further the extension emerges from the opening of the hollow cavity. Therefore, the status of the screw and nut connection may be evaluated from the side of the screw by measuring the degree to which the extension emerges from the opening of the hollow cavity in the screw. This measurement may be made either by visual inspection or by actually using a calibrated measuring device.

The extension may be colored or calibrated in order to aid in measuring the amount to which the extension has emerged from the opening of the hollow cavity in the screw.

BRIEF DESCRIPTION OF THE DRAWINGS

The invention is described in further detail through illustrative embodiments of the drawings wherein.

DETAILED DESCRIPTION OF THE INVENTION

Figure 1:
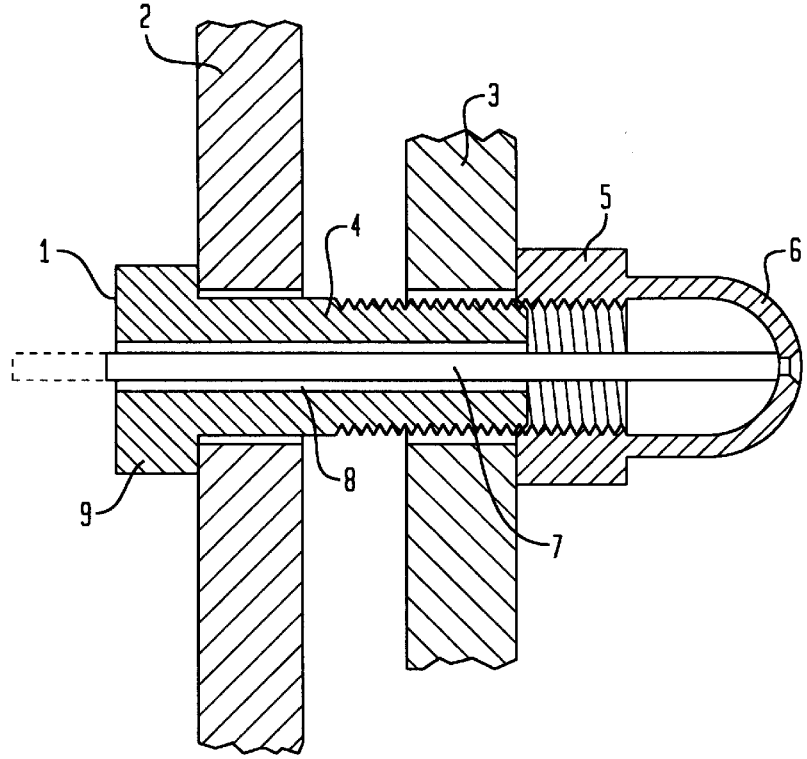
FIG. 1 shows a first embodiment of the inventive screw and nut assembly.

In FIGS. 1 to 4, the same reference numerals are used for parts having comparable functions.

FIG. 1 shows one embodiment of the screw and nut assembly according to the invention having a screw (4) and a nut (5). FIG. 1 illustrates the screw and nut assembly connecting two separate components (2 and 3).

The nut (5) is illustrated in a position in which it is not screwed onto the screw (4) (i.e., the threads of the nut (5) are not yet meshed with the threads of the screw (4)). An extension (7) in the form of a pin extends from the nut (5) and into a hollow space (8) of the screw (4). The extension (7) ends near the head (9) of the screw (4). Alternatively, the extension (7) may end at some point within hollow space (8) short of the screw head (4). As shown by the broken lines, the extension (7) may also traverse entirely the hollow space (8) of the screw (4), i.e., as seen from the nut (5), the extension may end on the other side of screw (4).

When the nut (5) and the screw (4) are screwed together, the position of the end of the extension (7) changes relative to a reference point or to a reference surface of the screw (4). For example, the position of the end of the extension (7) may change relative to the face (1) of the screw (4). The position of the extension (7) allows the user to evaluate the status of the screw (4) and nut (5) connection by observing the end of the extension (7) without seeing the nut (5).

Determining the position of the extension (7) may be made easier if the end of extension (7) is flush or substantially flush with the face (1) of the screw head (9) when the nut (5) is in the position shown in FIG. 1. In this position, even the slightest protrusion of the end of the extension (7) relative to the face (1) of the screw head (9) will be easily noticed. Therefore, the status of the screw and nut connection may be determined at a first glance.

In any of the above-mentioned positions, the end of the extension (7) may be colored to aid in determining the position of the extension (7) relative to a reference point or surface.

The nut (5) is designed so that it is able to accept the extension (7) and still provide an ample screwing depth. In the embodiment illustrated in FIG. 1, the nut (5) has a cap (6) which receives the end of the screw (4) that traverses the threads of the nut (5) when the screw connection is made. The extension (7) may be riveted to the cap (6) of the nut (5) or may be connected in any other suitable form. An integral design of nut (5) and the extension (7) is also possible.

Figure 2:
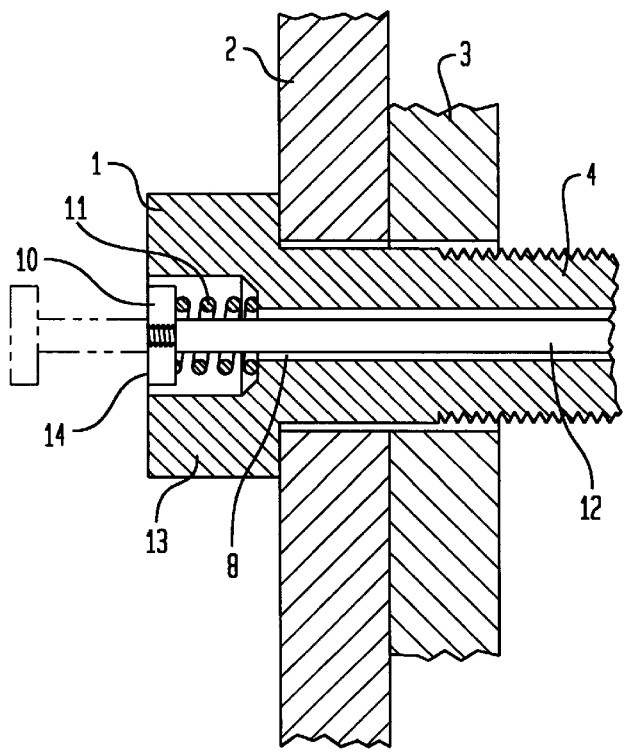
FIG. 2 shows a second embodiment of the inventive screw and nut assembly.

FIG. 2 shows another embodiment of the invention wherein the extension (12) has a head (10) located at an end of the extension (12) away from the nut (5). The extension (12) with head (10) makes it easier to discern the position of the extension in comparison to a headless extension. The head (10) is shown with its face (14) flush with the face (1) of the screw head (13) when the nut is set on the end of the screw (4) without being screwed on. As with the previous embodiment, the extension (12), including the head (10), may be colored or may have colored markings thereon so as to aid with the visual inspection of the extension (12).

In FIG. 2 a pre-stressed spring (11) is positioned between one side of the head (10) of the extension (12) and a part of the screw (4). The pre-stressed spring (11) produces a force which prestresses the screw (4) and the nut against each other. The assembly formed by the screw (4) and the nut therefore cannot be taken apart too easily. This arrangement is advantageous in situations where the screw must be fed through a slit or a narrowing longitudinal opening in order to connect two components together. Having the nut pre-stressed against the screw allows the nut and screw assembly to be fed through the narrow opening without having the nut disconnecting from the screw. Once the nut and screw assembly is positioned in its desired place, the nut can be tightened so as to connect the components. Simplified stock keeping is another advantage of this embodiment.

In the embodiment of FIG. 2, a portion of the hollow space (8) is wider near the screw head (13) to receive the head (10) of the extension (12). A step surface is thus produced on an inner surface of screw head (13) which is at a right angle to the longitudinal axis of the screw (4) and provides a bearing surface for the pre-stressed spring (11).

The head (10) may be attached to the end of the extension (12) in any suitable manner, or the extension (12) and head (10) may be integrally constructed. The head (10) may also be screwed onto the extension (12), as shown in FIG. 2, so that they may be disconnected and thereby provide access to the pre-stressed spring (11).

Figure 3:
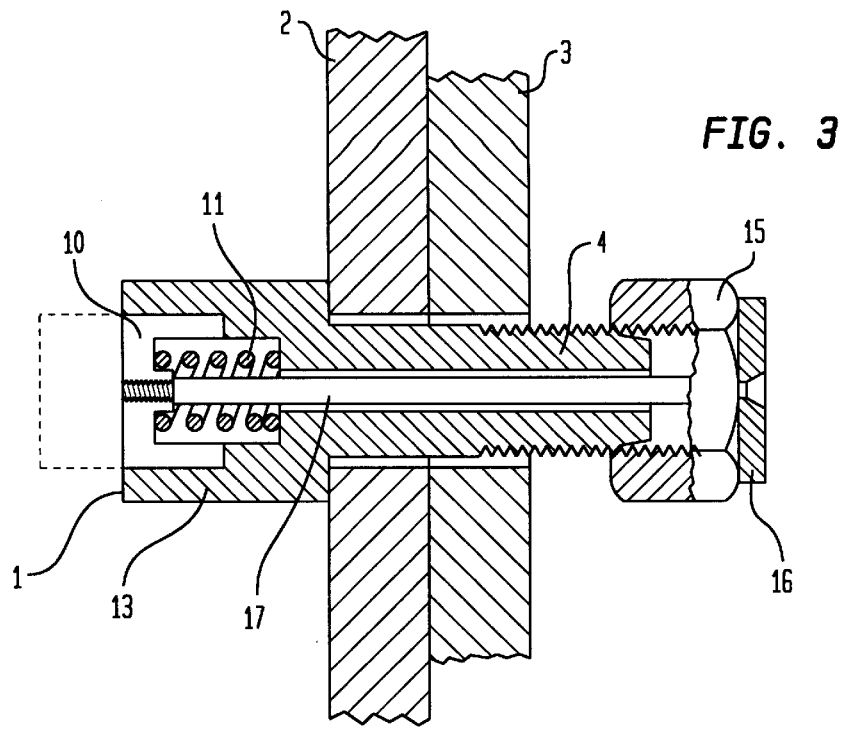
FIG. 3 shows a third embodiment of the inventive screw and nut assembly.

FIG. 3, in addition to the parts shown in FIG. 2, also shows the extension (17) having a second head (16) that is located at the end of extension (17) near the nut (15). The second head (16) of the extension (17) transmits the force of the pre-stressed spring (11) to the nut (15), so that the nut (15) is elastically clamped between the second head (16) of the extension (17) and the end of the screw (4).

When the nut (15) is screwed onto the screw (4) the pre-stressed spring (11) causes the extension (17), the head (10) and the second head (16) initially to move in the same direction as the longitudinal displacement of the nut (15). At the same time, the head (10) of the extension (17) which is near the screw head (13) is displaced so that the state of the screw connection can be recognized. The movement of the head (10), extension (17) and the second head (16) ends when the nut (15) is screwed completely, i.e., over its entire length, onto screw (4). At this point, the second head (16) makes contact with the screw end, and its longitudinal movement as well as the longitudinal movement of extension (17) and head (10) comes to an end. The final position of the head (10) at this point is illustrated by the broken lines.

One advantage of this embodiment as compared to the embodiments shown in FIGS. 1 and 2, is that less installation space is required for this embodiment on the side of the screw head (13) although the same screwing depth is provided. In addition, this embodiment uses a standard nut, e.g., a hexagonal nut.

Since the second head (16) is constantly pre-stressed by spring (11), the connection between the extension (17) and the second head (16) need only consist of a simple axial securing device that transmits the force of the pre-stressed spring (11) to the second head (16). Aside from this, the second head (16) may be placed loosely on the extension (17). The second head (16) of the extension (17) may be in the form of a simple disk, such as a plain washer, or any other suitable shape. Alternatively, the second head (16) may be fixedly attached to the extension (17).

Figure 4:
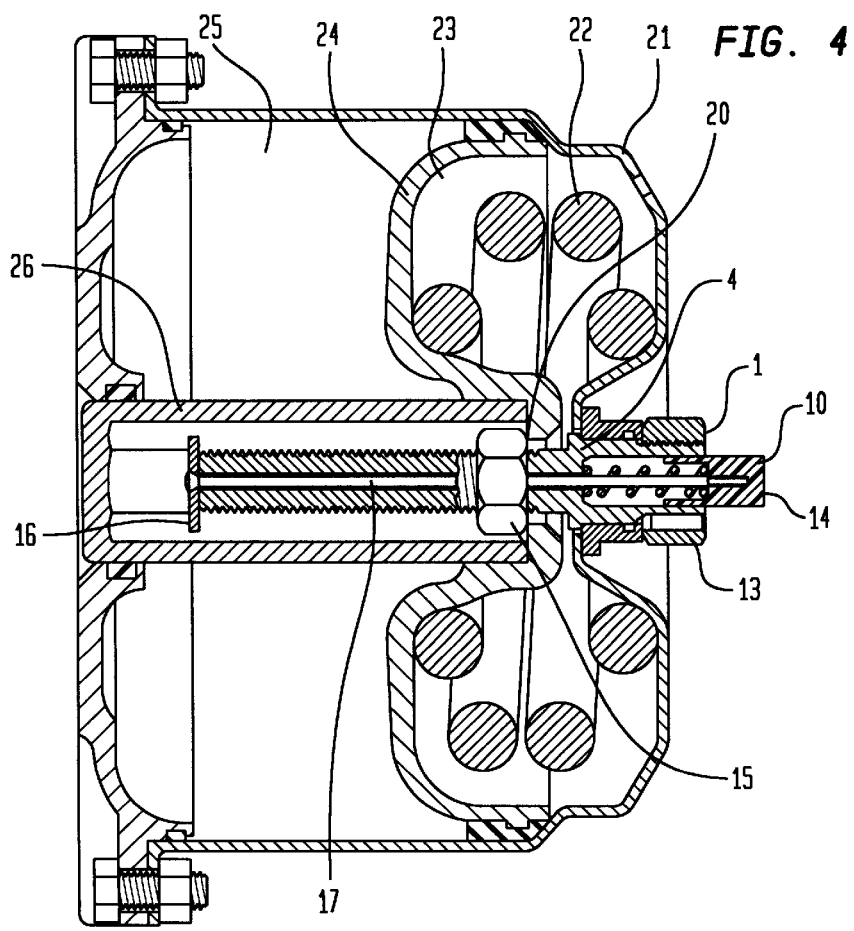
FIG. 4 shows a pre-stressed cylinder in which the inventive screw and nut assembly of FIG. 3 is incorporated.

FIG. 4 shows the screw and nut assembly of FIG. 3 incorporated into a mechanical release apparatus of a spring cylinder. Such spring cylinders have been described in EP 0 279 930 B1. One area in which spring loaded cylinders are used is in the field of vehicle brake technology, where they are often combined with a brake cylinder.

FIG. 4 shows a screw (4) fixedly mounted in its axial direction in a cylinder housing (21). The head (13) of the screw (4) is located outside the cylinder housing (21) and can be rotated together with the screw (4) from this location. The shaft of the screw (4) is detachably connected to screw head (13) so as to make assembly and disassembly of the device possible.

The nut (15) is mounted inside of cylinder housing (21) and is non-rotatable or nearly non-rotatable but capable of longitudinal displacement. The mounting of nut (15) is such that it is located in a force transmitter (24) which is capable of longitudinal displacement within the cylinder housing, with the nut (15) also being capable of longitudinal displacement but not rotatable. To achieve this, the force transmitter (24) is provided with an inner profile which is complementary to the outer contour of the nut (15). Thus, when the nut (15) is positioned within this inner profile, the nut (15) is essentially non-rotatable. For example, if the nut (15) is a hexagonal nut, the inner profile of the force transmitter (24) is also hexagonal, so that the hexagonal nut (15) fits snugly into the inner profile and is held there in a substantially non-rotatable position.

The force transmitter (24) is subjected to the force of a preloaded spring (22). The force transmitter (24) transmits this force to various components which are capable of using this force, e.g., to a wheel brake in a vehicle. For this purpose the force transmitter (24) has a hollow extension (26) the interior of which carries said inner profile. The frictional engagement and/or form fit between the end of the pre-loaded spring (22) and the force transmitter (24) may allow for a limited rotation of force transmitter (24) and thereby also the nut (15) within the cylinder housing (21), as the appertaining end of the pre-loaded spring (22) rotates when the spring-loaded cylinder is activated and released. Under these circumstances, the nut (15) is still considered to be non-rotatable or nearly non-rotatable.

The force transmitter (24) is sealed off in the cylinder housing (21) and is capable of longitudinal displacement. The force transmitter can therefore be used as a piston with its extension (26) constituting a piston rod. When sealed, the force transmitter (24) together with cylinder housing (21) separate a spring chamber (23) which receives the pre-loaded spring (22) from an expansion chamber (25) which may be put under pressure so as to oppose the force exerted by the pre-loaded spring (22). If the pressure in the expansion chamber (25) is sufficiently high, it may interrupt or prevent the transmission of a force via the force transmitter (24) and therefore result in the release of the spring cylinder or keep it in a released position.

When the spring cylinder is in a service state, the nut (15) is placed on the tip of the screw (4) and is not screwed on. The length of the screw is sized so as not to hinder the longitudinal displacement of the force transmitter (24) from a release end position to an actuating end position. Both end positions are determined by housing stops in the cylinder housing (21). The force transmitter (24) may assume any desired actuating position within the limitations set by the housing stops. The actuating position is determined in each case by the components utilizing the force of the pre-loaded spring (22).

FIG. 4 shows the spring cylinder comprising the nut (15) and screw (4) assembly (which constitutes the mechanical releasing apparatus) in the release end position.

To move the spring cylinder from an actual actuating position towards its release end position, the screw head (13) and the screw (4) are rotated in the tightening direction. The non-rotatable nut (15) is thereby screwed onto the threads of the screw (4) and the nut (15) is longitudinally displaced towards the screw head (13). After the nut (15) has been displaced through an empty space, the non-rotatable nut (15) engages a shoulder (20) located on the force transmitter (24). As the non-rotatable nut (15) continues its longitudinal displacement, the nut (15) presses against the shoulder (20) and displaces the force transmitter (24) towards the screw head (13). This displacement takes place against the force of the pre-loaded spring (22). The longitudinal displacement continues until the force transmitter (24) makes contact with the release end housing stop. The length of the empty space depends on the actual actuating position of force transmitter (24).

When the screw and nut assembly is in its service position, the head (10), having the face (14) located on the end of the extension (17) away from the non-rotatable nut (15), is flush with the face (1) of the screw head (13). As the screw (4) is screwed into the non-rotatable nut (15), the head (10) of the extension (17) begins immediately to emerge from the face (1) of the screw head (13).

This permits one to recognize on first glance whether the force transmitter (24) is fully displaceable between its end positions, or whether its displaceability is limited. If the force transmitter is fully displaceable, then the full stroke of the spring cylinder is available; otherwise only a part of this stroke is available.

Rotating the screw head (13) in the opposite direction causes the spring cylinder and the mechanical release apparatus to return to the release end position, wherein the head (10) of extension (17) is again flush against the screw head (13).

The head (10) of the extension (17) has a cylindrical shape in further developments according to FIGS. 3 and 4 in order to protect the interior of the screw and thereby the interior of the particular application from environmental influences, so that even when completely protruding from the screw head (13), head (10) of the extension (17) remains within the screw head (13).

The pre-stressed spring (11) keeps the extension (12 or 17) under tension at all times. It is for this reason that the extension (12 or 17) may also be made out of a chain, or a cable-like material.

While the invention has been described by reference to specific embodiments, this was for purposes of illustration only. Numerous alternative embodiments will be apparent to those skilled in the art and are considered to be within the scope of the invention.

We claim:

1. A screw and nut assembly, comprising;
    a screw having a longitudinally extending hollow cavity;
    a nut which screws onto said screw, and
    an extension extending from said nut, the extension being in force-transmitting contact with said nut when said nut is placed on an end of said screw without being screwed on, said extension traversing said hollow cavity of said screw when said nut is placed on an end of said screw without being screwed on, said extension being displaced from said hollow cavity of said screw as said nut is screwed onto said screw.

2. A screw and nut assembly, comprising;
    a screw having a head at a first end and a longitudinally extending hollow cavity;
    a nut which screws onto said screw; and
    an extension extending from said nut, the extension being in force-transmitting contact with said nut when said nut is placed on an end of said screw without being screwed on, said extension penetrating into said hollow cavity of said screw when said nut is placed on a second end of said screw without being screwed on, said extension being displaced from said hollow cavity of said screw as said nut is screwed onto said screws.

3. The screw and nut assembly of claim 2 wherein said screw has a screw head and said extension terminates near said screw head of said screw when said nut is placed on said screw without being screwed on.

4. The screw and nut assembly of claim 1 wherein said extension has a head at an end away from said nut.

5. The screw and nut assembly of claim 4 further comprising a pre-stressed spring located between said head of said extension and a portion of said screw, said spring pre-stressing said nut against said screw.

6. The screw and nut assembly of claim 5 wherein said extension has a second head at an end of said extension in the vicinity of said nut, said second head transmitting force from said prestressed spring to said nut at least prior to said nut being screwed onto said screw.

7. The screw and nut assembly of claim 1 wherein said screw has a screw head at an end away from said nut, and wherein an end of said extension is at least substantially flush with a face of said head when said nut is placed on said screw without being screwed on.

8. The screw and nut assembly of claim 1 wherein said extension has a head at an end of said extension that is away from said nut, and wherein said extension head is at least substantially flush with a face of said screw head.

9. The screw and nut assembly of claim 1 wherein said extension is in the form of a pin.

10. The screw and nut assembly of claim 1 which is located within a cylinder having a pre-loaded spring, wherein said screw is mounted axially fixed in a cylinder housing but is rotatable from outside said cylinder housing, wherein said nut is mounted in said cylinder housing so that it is substantially non-rotatable but capable of longitudinal displacement, and wherein said nut slaves a force transmitter subject to force from said pre-loaded spring against the force of said pre-loaded spring over at least a part of the longitudinal displacement resulting from rotation of said screw.

* * * * *